No. 874,911. PATENTED DEC. 24, 1907.
F. J. HEYBACH.
WEIGHING AND CAN FILLING APPARATUS.
APPLICATION FILED APR. 11, 1906.
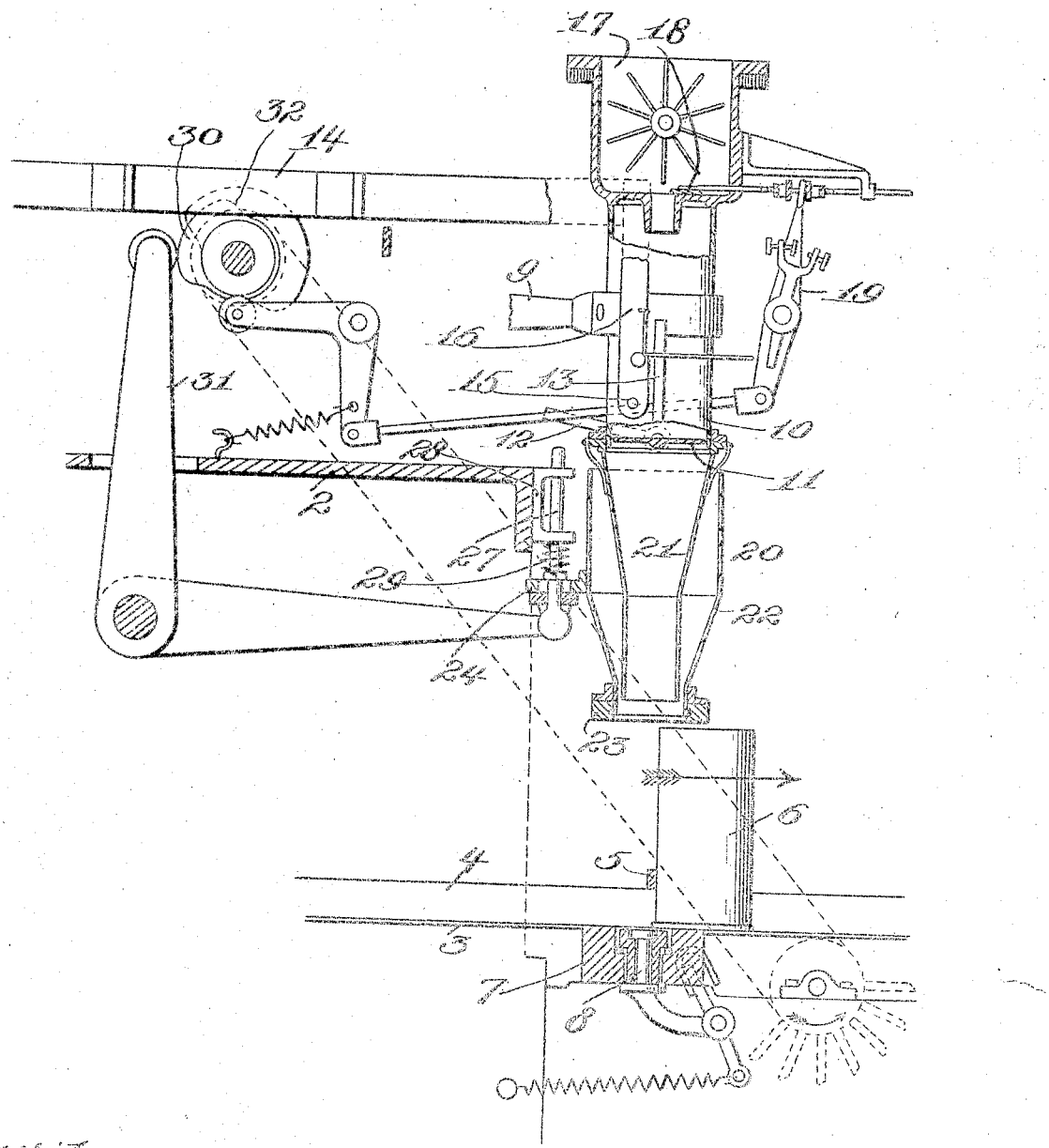
Witnesses
Inventor
Frederick J. Heybach
By
James L. Norris
atty

UNITED STATES PATENT OFFICE.

FREDERICK J. HEYBACH, OF SAVANNAH, GEORGIA, ASSIGNOR OF ONE-HALF TO MOREHOUSE MANUFACTURING COMPANY, OF SAVANNAH, GEORGIA, A CORPORATION OF GEORGIA.

WEIGHING AND CAN-FILLING APPARATUS.

No. 874,911.　　　Specification of Letters Patent.　　　Patented Dec. 24, 1907.

Application filed April 11, 1906. Serial No. 311,157.

*To all whom it may concern:*

Be it known that I, FREDERICK J. HEYBACH, a citizen of the United States, residing at Savannah, in the county of Chatham and State of Georgia, have invented new and useful Improvements in Weighing and Can-Filling Apparatus, of which the following is a specification.

This invention relates to weighing and can filling apparatus, the object of the invention being to provide simple apparatus of this kind primarily intended for delivering charges of material into cans or equivalent receptacles, and this the machine can do in a rapid manner without waste.

In the drawing accompanying and forming part of this specification I show in longitudinal sectional side elevation one form of embodiment of the invention which, to enable those skilled in the art to practice said invention, will be fully set forth in the following description, while the novelty of the invention will be included in the claims succeeding said description. The apparatus thus illustrated may be modified in a variety of ways within the scope of my invention as covered in said claims.

The apparatus includes in its make-up a weighing device which, as will hereafter more particularly appear, is substantially the same as that disclosed in Letters Patent No. 791,342 granted to me May 30, 1905, and to which reference may be had.

The different parts of the apparatus may be supported in any desirable way. The framework shown in part for this purpose is denoted in a general way by 2. Cans to be filled, and only one of which is represented in the drawing, are fed along a way as 3 between strips as 4, only one of which is shown, by means of chains or the like connected by slats as 5. The feed chains or equivalent means impart to the cans a step by step movement, the parts being so related that, when the feed chains are at rest, a can will be in position to receive a charge of material from the weighing device, although the can 6 in the drawings is supposed to be moving in the direction of the arrow, having received a charge of material. Said can, when in position to receive said charge, is sustained upon suitable supporting means, as the cross-piece 7, in connection with which tapping mechanism such as that denoted in a general way by 8, is operative. This tapping mechanism forms no part of the present invention, for which reason it need not be shown or described in detail; it, however, is fully shown and claimed in my concurrently pending application, Serial No. 334,181, filed Sept. 11, 1906. While the can 6 is on the supporting cross-piece 7 or similar part it is subjected to the action of said tapping mechanism.

The weighing device comprises a scale beam as 9 to which is connected the weighing bucket or hopper 10. The bucket or hopper 10 is equipped with a closer or discharge gate 11 carrying exteriorly thereof the arms 12 and 13 engageable alternately by a power-operated reciprocatory member as 14. When the reciprocatory member 14 is moved toward the right, the pin 15 on the depending arm 16 thereof strikes the arm 13 to thereby open the closer or valve 11 to permit the discharge of the contents of the bucket or weighing hopper 10. On the retractive or backward movement of said member 14 the pin 15 strikes the arm 12 for the purpose of closing said valve or closer 11. The weighing device and its adjuncts just described may be and preferably are of the character shown in the Letters Patent to which I have referred, for which reason an extensive description of the same is unnecessary.

The material may be supplied to the weighing hopper or bucket 10 from a supply hopper as 17 the stream from which is controlled by a valve as 18 operable by mechanism denoted in a general way by 19. The valve-operating mechanism forms in itself no part of the present invention, for which reason it need not be set forth in detail herein. It is fully set forth and claimed, however, in my contemporaneously pending application Serial No. 334,180, filed Sept. 11, 1906.

The loads of material successively discharged from the bucket 10 are guided into empty cans by a tube such as that denoted in a general way by 20. The tube 20 is shown as comprising two sections, an inner section as 21 and an outer section as 22, said inner section being illustrated as being of funnel shape and being fastened in some suitable manner at its upper end to the lower end of the bucket 10. Said funnel guides the mass of material into an empty can, although in the present case its lower edge does not come directly to the top of the can. I prefer to provide suitable means, as will hereinafter appear, to cover the gap between the lower end of the section 21 and the upper edge of the can, so as to prevent the passage of material through this gap. The funnel or inner section 21 will be so connected with the bucket 10 as to prevent the escape of material between such two parts. The outer section 22 has an up and down movement with respect to the funnel or inner section 21 for a purpose that will hereinafter appear. Around the lower portion of said outer section 22 is fastened a ring as 23 of some suitable yieldable material, such as sponge rubber. Just before the load of material is discharged from the bucket 10 into the funnel 21, the tubular section 22 is lowered so as to carry the packing 23 thereon into solid contact with the upper edge of an empty can located directly under said funnel so that, when the load is discharged from the bucket, the funnel will guide the load into the empty can, while the packing assisted by the outer section 22, will prevent escape of any of the material, which is particularly of advantage when the material is highly pulverulent, such for instance as yeast powder.

On the exterior of the tubular section 22 is fastened suitably a bracket as 24 from which rises one or more spindles as 27 guided for reciprocation by guide brackets as 28 on the framework of the machine, said spindle or spindles being surrounded by a spring or springs 29 acting against the bracket or brackets 28 and bracket 24, respectively. The spring or springs 29 serve to impart a downward thrust to the bracket 24 for lowering the tubular section 22 for the purpose of carrying the packing 23 into engagement with the upper edge or top of the can 6 when the latter is on the support 7. An intermittently power-operated cam is shown at 30 and this cam serves to actuate an angle lever as 31, the normally horizontal arm of which is equipped with a member as 31 for engaging the bracket 24. The cam 30 has a let-off or releasing portion 32. The active portion of the cam 30 is shown in engagement with the upper end of the angle lever 31 so as to maintain the telescopic section 22 through the intermediate parts in its upper position. When, however, a can as 6 has been positioned on the support 7 with said cam under the funnel 21, it being assumed that the cam 30 is turning at this time, and when the releasing portion 32 of said cam comes opposite the angle lever 31, the spring or springs 29 may operate to thrust the bracket 24 and thereby the tubular section 22 downward to carry the packing 23 into engagement with the upper end of the empty can, so that, when the load of material is discharged from the bucket 10, the material constituting the same cannot be wasted, for not only is the load delivered in an accurate manner into the can, but all scattering of the material is prevented. When the material is delivered into the can the operative portion of the cam 30 by acting against the angle lever 31, returns the tubular section 22 to its initial or elevated position. It will be understood that the cam normally holds the tubular section 22 up with the packing in a plane above the tops of the cans.

What I claim is:

1. The combination of a weighing device including a bucket, means for supporting a can in position to receive a charge of material from the bucket, a tubular device carried by the bucket for directing material from the bucket into the can, and means for closing the space between the tubular device and the can to prevent waste of material therethrough.

2. The combination of a weighing device including a bucket, means for supporting a can in position to receive a charge of material from the bucket, a funnel depending from the bucket for delivering material into the can, and means for closing the space between the funnel and the can to prevent waste of material therethrough.

3. The combination of a weighing device including a bucket, means for supporting a can in position to receive a charge of material from said bucket, a tubular device to direct the material from the bucket into the can, a tubular member surrounding and movable relatively to said tubular device and provided with a packing, and means for operating the tubular member to carry the packing into contact with the can on the flow of material into the latter, for preventing waste of material between the tubular device and the can.

4. The combination of a weighing device including a bucket, means for supporting a can in position to receive a charge of material from said bucket, a tubular device to direct the material into the can and carried by the bucket, a tubular member surrounding the tubular device, supported independently of the bucket and provided with a packing, and means for operating the tubular member with respect to the tubular device to carry said packing into contact with the can on the delivery of material into the latter, said packing serving to prevent waste of material, when it engages the can between the latter and the tubular device.

5. The combination of a weighing device including a bucket, means for supporting a can in position to receive a charge of material from said bucket, a funnel pendent from the bucket for directing the material from said bucket into the can, a tubular member surrounding the funnel and provided with a packing at its lower edge, and means for operating the tubular member on the delivery of material into the can to carry said packing against the upper edge of the can and prevent the waste of material between the can and the funnel.

6. The combination of a weighing device including a bucket, means for positively moving the can into position under the bucket and for holding it in such position to receive a charge of material from said bucket, a tubular device to direct the material from the bucket into the can, and means for closing the space between the tubular device and the can to prevent waste of material.

7. The combination of a weighing device including a bucket, means for supporting a can in position to receive a charge of material from the bucket, a telescopic tubular device, one section of which is carried by the bucket and means for operating the other section of said telescopic device to carry the same into contact with the can on supply of material to the latter.

8. The combination of a weighing device including a bucket, means for supporting a can in position to receive a charge of material from said bucket, a funnel depending from the bucket for directing material from said bucket into the can, a tube surrounding the funnel and provided at its lower edge with a packing, spring means to lower the tube to carry the packing into contact with the can, cam mechanism normally holding the tube up with the packing out of contact with the can, and means for operating the cam mechanism on the supply of material to the can to cause said spring means to move the packing into engagement with said can.

9. The combination of a weighing device including a bucket, a funnel depending from the bucket, for directing material into a suitable receptacle, and means movable relatively to the funnel for closing the space therebetween and the receptacle to prevent waste of material through said space.

10. The combination of a weighing device including a bucket, a funnel depending from the bucket, for delivering material received from the bucket into a suitable receptacle, and a tubular member surrounding and movable with respect to the funnel and provided with a packing at its lower end.

11. The combination of a weighing device including a bucket, a funnel for receiving material from the bucket and for directing the same into a suitable receptacle, a tubular member surrounding and supported independently of the funnel, and means for shifting the tubular member with respect to the funnel.

12. The combination of a weighing device including a bucket, means for supporting a can in position to receive a load from said bucket, and tubular means for directing the load from the bucket into the can and having a packing movable into engagement with the can.

In testimony whereof I have hereunto set my hand in presence of two subscribing witnesses.

FREDERICK J. HEYBACH.

Witnesses:
C. B. WESTCOTT,
Jos. J. CARR.